United States Patent [19]

Bartkovitz et al.

[11] 4,394,493

[45] Jul. 19, 1983

[54] CROSSLINKABLE POLY(OXYALKYLENE) GRAFT COPOLYMERS

[75] Inventors: David J. Bartkovitz, North Tarrytown; George H. Greene, Croton-on-Hudson, both of N.Y.

[73] Assignee: Union Carbide Corporation, Danbury, Conn.

[21] Appl. No.: 307,211

[22] Filed: Sep. 30, 1981

[51] Int. Cl.$^3$ .............................................. C08F 283/06
[52] U.S. Cl. .................................... 525/530; 252/8.8; 252/51.5 R; 428/395; 528/421; 564/204; 564/208
[58] Field of Search ............... 525/530, 404, 187; 528/421; 252/51.5 R, 8.8; 564/204, 208

[56] References Cited

U.S. PATENT DOCUMENTS

| | | | |
|---|---|---|---|
| 2,719,175 | 9/1955 | Coover, Jr. et al. | 260/561 |
| 3,418,354 | 12/1968 | Wheeler, Jr. | 260/448.2 |
| 3,546,321 | 12/1970 | Jabloner et al. | 260/874 |
| 3,652,212 | 3/1972 | Machell | 8/115.5 |
| 3,654,244 | 4/1972 | Pittman et al. | 260/79.7 |
| 3,660,010 | 5/1972 | Georgoudis et al. | 8/115.6 |
| 3,799,910 | 3/1974 | Shingai et al. | 260/78.5 UA |
| 3,950,317 | 4/1976 | Patton, Jr. et al. | 260/88.3 A |
| 4,028,434 | 6/1977 | Konter et al. | 528/392 |
| 4,094,797 | 6/1978 | Newkirk et al. | 8/115.6 |

FOREIGN PATENT DOCUMENTS 1220786 1/1971 United Kingdom .

*Primary Examiner*—Theodore E. Pertilla
*Attorney, Agent, or Firm*—Jean B. Mauro

[57] ABSTRACT

Crosslinkable graft copolymers of poly(oxyalkylene) are provided which comprise from about 1 percent by weight of a substituted N-methylol derivative of acrylamide grafted onto a poly(oxyalkylene)-polymer.

2 Claims, No Drawings

CROSSLINKABLE POLY(OXYALKYLENE) GRAFT COPOLYMERS

TECHNICAL FIELD

This invention pertains to graft copolymers and, more particularly, to compounds having N-methylol derivatives of acrylamide grafted onto poly(oxyalkylene) polymers to form graft copolymers which are crosslinkable and to methods for preparing such graft copolymers.

BACKGROUND ART

Poly(oxyalkylene) compounds including poly(oxyethylenes), poly(oxypropylenes) and copolymers thereof have many and diverse industrial uses such as treatments for metals, paper, textiles and the like. However, when used in textile and carpet applications, for example, the poly(oxyalkylene) compounds are readily removed from the surface of the substrate materials during the various treatments employed and its effectiveness is, thus, reduced. There is a need, therefore, for modified poly(oxyalkylene) compounds which possess many or all of the properties of the unmodified compounds plus new or improved physical and/or chemical properties such as, for example, providing a more durable coating.

Techniques for producing copolymers by grafting olefins onto other polymers such as poly(oxyalkylene) polymers are, in general, well known. However, the resultant graft copolymers are not crosslinkable, are generally not substantive to surfaces, and are often seriously contaminated with by-products, one common contaminant being homopolymers of the monomer used in the graft polymerization reaction.

A process for preparing graft copolymers of poly(oxyalkylene) compounds with a wide variety of olefins which is reported to substantially reduce the formation of insoluble homopolymer by-products and produce products having improved and/or modified properties is disclosed in U.S. Pat. No. 3,418,354 to Wheeler, Jr. The method disclosed by the patentee generally involves preparing a mixture of an olefin and a catalytic amount of a peroxide containing a peroxide group linked to a tertiary carbon atom and slowly adding said mixture to a poly(oxyalkylene) compound which is maintained at a temperature high enough to cause the grafting reaction to occur. A wide variety of olefinic compounds are suggested as being applicable for use in the grafting reaction of the invention including organic olefins such as styrene, acrylonitrile, alkyl acrylates, and the like. However, none of the graft copolymers of poly(oxyalkene) compounds disclosed are known to significantly enhance the retentivity thereof to substrates such as textile materials and none of the materials disclosed form graft copolymers which are crosslinkable.

Further, in U.S. Pat. No. 3,546,321 to Vandenberg et al. is also disclosed a method for preparing graft copolymers of polyether polymers and monomers containing ethylene unsaturation. In the process of the invention, polyether polymers having a hydrogen attached to a carbon atom alpha to an ether oxygen in the polymer backbone are first contacted with oxygen in the presence of an initiator agent to form the hydroperoxide thereof. Graft copolymers are then prepared from the polyether hydroperoxides by polymerizing one or more vinylidine or vinyl monomers by free radical mechanism at free radical sites on the polyether main chain created by decomposition of the hydroperoxy groups. While the process of the patent is shown to prepare graft copolymers of polyether polymers, it requires a two stage process which may be more complex than desired for a number of applications and none of the graft copolymers disclosed would be crosslinkable.

DISCLOSURE OF THE INVENTION

In an accordance with the present invention, graft copolymers of an N-methylol derivative of acrylamide monomer and a poly(oxyalkylene) are provided having up to about 70 percent by weight of said N-methylol derivative of acrylamide, based on the total weight of poly(oxyalkylene); grafted onto poly(oxyalkylene) polymers having the formula:

$$R''[(OC_nH_{2n})_zOR']_a$$

wherein R" is a hydrocarbon radical containing up to 10 carbons and has a valence of a, a is an integer having a value of 1 to 4, R' is a hydrogen atom or a monovalent hydrocarbon radical containing up to 6 carbons, n has a value of 2 to 4 inclusive, and z is an integer having a value of about 2 to about 800, said graft copolymers being crosslinkable, and preferably, film forming.

It has been discovered that the graft copolymers of the invention are substantially free of insoluble homopolymerized monomer (contains less than 2% by weight of said insoluble homopolymer) and are generally fluids even when up to about 70 percent by weight of N-methylol derivative of acrylamide is grafted onto the poly(oxyalkylene) compound. Moreover, such graft copolymers, have been found to be crosslinkable; to exhibit improved properties such as being more substantive to textile and carpet materials, particularly those made from synthetic fibers, without adversely affecting the ability to adhere other materials to such fibers and for certain applications to exhibit improved lubricity.

DETAILS OF THE INVENTION

Graft copolymers of the present invention having a N-methylol derivative of acrylamide grafted onto a poly(oxyalkylene) compound are prepared by a method which comprises adding a N-methylol derivative of acrylamide monomer as hereinafter more fully described and a suitable catalyst to an agitated bath of the poly(oxyalkylene), whereby all of said components are intimately admixed at a temperature at which reaction occurs, and maintaining said temperature until said graft copolymer of acrylamide derivative on poly(alkylene oxide) is obtained.

The poly(oxyalkylene) compounds used to make the graft copolymers of the invention are known in the art and have the formula:

$$R''[(OC_nH_{2n})_zOR']_a$$

wherein R" is a hydrocarbon radical containing up to 10 carbon atoms and has a valence of a, a is an integer having a value of 1 to 4, R' is a hydrogen atom or a monovalent hydrocarbon radical containing up to 6 carbon atoms, n has a value of 2 to 4 inclusive, and z is an integer having a value of about 2 to about 800.

In general, these compounds contain oxyethylene, oxypropylene, oxybutylene groups or both oxyethylene groups and higher oxyalkylene groups such as oxypropylene and oxybutylene groups, either in random or block distribution in their molecules, and have molecular weights (number average) in the range of about 100 to about 35,000, and, preferably, in the range of about 1,500 to 4,000. These poly(oxyalkylene) compounds may be made by processes well known in the art by reacting an alkylene oxide or mixtures of alkylene oxides with an aliphatic compound which may be saturated or contain some aliphatic unsaturation, having from one up to as many as four active hydrogen atoms, such as water, monohydroxylic alcohols such as ethanol, propanol, and allyl alcohol; dihydroxylic alcohols such as ethylene glycol and monoethylether of glycerine; trihydroxylic alcohols such as glycerine and trimethylolpropane; and tetrahydroxylic alcohols such as sorbitol. The poly(oxyalkylene) products of such reactions will have linear or branched oxyalkylene or mixed oxyalkylene chains, and such chains will terminate with hydroxyl groups. Some or all of these hydroxyl groups may be etherified by reaction with a dialkyl sulfate such as diethyl sulfate.

The grafting monomers employed in preparing the copolymers of the present invention are substituted acrylamide monomers having the formula

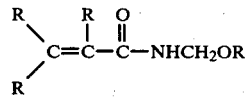

wherein R may be the same or different and is a hydrogen atom or a monovalent hydrocarbon radical containing from 1 to about 6 carbon atoms. These acrylamide derivatives monomers are generally homopolymerizable monomers with a reactive cross linkable pendant group or groups. Illustrative suitable monomers are methoxymethyl acrylamide, ethoxymethyl acrylamide, N-butoxymethyl acrylamide, allyloxymethyl acrylamide, N-butoxymetharylamide and preferably, N-methylolacrylamide and N-(iso-Butoxymethyl)-acrylamide.

A catalyst is employed in the process of the invention which is a free radical initiator (grafting catalyst). The choice of such initiator is important but any one of a wide variety of known inorganic or organic free radical initiators may be used. The choice of initiator will generally depend on the particular combination of reactants from which the graft copolymer will be prepared. Exemplary of suitable initiators are azobisisobutyronitrile; hydroperoxides such as t-butyl hydroperoxide and cumene hydroperoxide; acyl peroxides such as benzoxyl peroxide; peroxides such as t-butyl peroxyprivalate, di-t-butyl peroxide, and t-butyl perbenzoate; peroxycarbonates such as diethyl peroxydicarbonate and diisopropyl peroxycarbonate; and persulfates such as potassium and sodium persulfates.

Homogeneous graft copolymers of the present invention which are substantially free (contains less than 2 percent by weight) of insoluble homopolymerized acrylamide derivative may be prepared by methods known in the art but preferably are prepared in accordance with the present invention by charging the reactants in two separate feed streams, advantageously in gradual and/or incremental amounts, one of which consists of the grafting monomer and a second consisting of the free radical grafting initiator. Either of the reactants may be mixed with a portion of the poly(oxyalkylene) compound prior to feeding them to the reaction zone when doing so facilitates the gradual or incremental feeding thereof to the reaction mixture. The amount of acrylamide derivative added to the polymerization reactor zone is not critcal and may be varied over a wide range. In general, however, up to about 70 percent by weight, and preferably from about 1 percent by weight to about 50 percent by weight based on the total weight of poly(alkylene oxide) compound, is charged.

The temperatures at which the graft reaction, of the present invention may be carried out may vary over a wide range and depend, in general, upon the combination of reactants to be used in the reaction. For example, when organic free radical grafting initiators are employed, a temperature sufficient to activate the initiator to about 160° C. can be used in the grafting reacting, and preferably, a temperature in the range from about 70° C. to about 100° C. Where employing inorganic free radical initiators, a temperature from about above the freezing point of the solvent to about 65° C. may be employed. Reaction temperatures above 160° C. lead to gelling of the reaction mixture, and should be avoided.

Incremental and/or gradual addition of the two separate reactant feed streams coupled with efficient agitation of the poly(oxyalkylene) compound in the reaction zone constitutes the most important technique for producing the graft copolymers of the present invention. This method is particularly important in large scale or commercial operations, not only for preparing the desired homogenous graft copolymer, but also to facilitate handling and storage of the monomer and the free radical initiator.

The grafting reaction of the invention is preferably carried out in bulk without the use of a solvent. If desired, however, a solvent may be used which is nonreactive and inert to the reactants. Suitable solvents include benzene, toluene, tertiary-butylbenzene, heptane, hexane, or octane, and mixtures thereof, and water.

The graft copolymers of this invention provide poly(oxyalkylene) copolymers which are crosslinkable, thus rendering them significantly more retentive to a wide range of substrates including textile fibers and fabrics. Moreover, such graft copolymers have been found to have modified and improved properties which render them more useful than the base poly(oxyalkylene) polymers as lubricants for metals, textiles, fibers and carpets, and the like.

Although the graft copolymers of the invention crosslinks on exposure to heating at, for example, 100°–150° C., addition of organic catalysts such as para-toluenesulfonic acid, citric acid, and the like are generally added to accelerate crosslinking. Particularly with textile fabrics, use of inorganic catalysts such as zinc fluoroborate is advantageous.

This invention is further described in the Examples which follow. All parts and percentages are by weight unless otherwise specified.

EXAMPLE 1

A 12 liter, three-neck round bottom glass flask fitted with a serum stopper, a motor driven mechanical stirrer, and a condenser was used to carry out the reaction of this example. The condenser top was connected to a nitrogen source and to a bubbler. An initial charge of 3,663 grams of an allyl alcohol started ethylene oxide/propylene oxide (40/60 by weight) methoxy capped poly(oxyalkylene) having a viscosity of 2700 SUS (seconds Universal Sayloblt) and a molecular weight (average number of 3700 was placed in the flask and then swept with nitrogen. A thermocouple through the serum stopper in the flask was used to control the electrical input to a heating mantle in which the flask rested. Two stainless steel cylinders suspended from load cells having plastic tubing connected to five metering valves and 1/16 inch stainless steel tubing through the serum stopper are used to add reactant feed to the reactor. The tubing was positioned to deliver the monomer reactant into the vortex created by the mechanical stirrer in the polymer charge and the initiator to the periphery of the charge. Both feeds are adjusted to be delivered above the liquid level of the reaction mixture and to drop directly into the reactor, not down the walls.

The initial charge of poly(oxyalkylene) was brought to a temperature of 80° C., with stirring. One feed reservoir was used to add an initiator feed of 45.8 grams of 75% t-butyl perbenzoate in mineral oil. The other feed reservoir was used to add a feed of 499.4 grams of N-(iso-butoxymethyl) acrylamide (IBMA) (12% of the total weight of the reaction charge). The initiator was slowly fed to the stirred, heated charge in the reactor for 15 minutes before adding acrylamide monomer to the charge in the reactor and, thereafter, both initiator and monomer were concurrently added through separate feed lines over a period of 60 minutes. The resulting reaction mixture was stirred, while maintaining the temperature at 80° C., for an additional 15 minutes before cooling to ambient temperature.

The graft copolymer obtained was a light amber, clear liquid having a Brookfield Viscosity at 25° C. of 8200 cps (average) at 3,6, and 12 rpm. Proton NMR analysis of the product showed no unreacted IBMA monomer.

The procedure hereinabove described was repeated with the exception that the charge contained 6 percent by weight of IBMA instead of 12 percent. The resultant copolymer was a light amber, clear liquid that had an average Brookfield Viscosity at 25° C. of 2930. Proton NMR analysis of the product showed no unreacted IBMA monomer.

EXAMPLE 2

The procedure of example 1 was repeated with the exception that the poly(oxyalkylene) was an allyl alcohol started ethylene oxide/propylene oxide (40/60 by weight) polymer having a viscosity of 450 SUS (seconds Universal Saybolt) having a molecular weight (average number) of 1400 and an IMBA charge of 12.5% by weight of the reaction charge was used. The graft copolymer obtained was a clear liquid having a Brookfield Viscosity at 25° C. of 1420 (average) at 6, 12, 30, and 60 rpm. The graft copolymer gelled after aging 20 min at 150° C. indicating that crosslinking had occurred.

The procedure hereinabove described was repeated with the exception that the charge contained 6 percent by weight of IBMA instead of 12½ percent. The resultant copolymer was a clear liquid having a Brookfield Viscosity at 25° C. of from 300 to 520 cps at 6, 12, 30, and 60 rpm. The copolymer gelled after aging 20 minutes at 150° C. indicating that the copolymer was crosslinkable.

EXAMPLE 3

A four-neck reaction vessel equipped with a mechanical stirrer, a thermoregulator, two separate addition funnels and a condenser containing a nitrogen inlet was used in this example. The initial charge of poly(oxyalkylene) was swept with nitrogen for four minutes and then heated, with stirring, to the reaction temperature while maintaining a positive nitrogen pressure on the condenser. A catalyst dissolved in the poly(oxyalkylene) compound was slowly added to the reaction mixture through one of the addition funnels. Concurrently, a solution of the acrylamide derivative monomer reactant in a portion of the poly(oxyalkylene) was slowly added to the reactor charge through the remaining addition funnel. The reactor charge was stirred to maintain a good vortex and the monomer reactant was added directly in the vortex area. After addition of the initiator and reactant monomer to the reactor charge was completed, the reaction mixture was heated for an additional period of time with stirring.

Run #1:

Using the procedure described above, 320 grams of polyoxypropylene monobutyl ether having a viscosity of 1145 SUS (seconds Universal Saybolt) was charged to the reactor and heated to 150° C. A solution of 25 grams of IBMA, the reactant monomer used in Example 1, in 65 grams of the polyoxypropylene monobutyl ether was slowly added to the reactor charge through one of the addition funnels A solution of 1.25 grams of t-butyl perbenzoate dissolved in 90 grams of the poly(oxyalkylene) compound was concurrently slowly added to the reactor charge through the second addition funnel. The total time used to admix the reactant monomer and initiator with the reactor charge was 45 minutes. After the addition was completed, the reaction mixture was stirred for an additional 60 minutes at 150° C. The monomer was added in this run in an amount sufficient to achieve a 5 percent by weight of grafted monomer with a molar ratio of monomer to poly(oxyalkylene) polymer of 0.74:1.

After completion of the reaction, the product mixture was vacuum stripped and the cooled for analysis. The final product was a light green, clear liquid which infrared spectrum analysis indicated had a low olefinic content. The copolymer gelled when heated for 40–60 minutes at 150° C. indicating that the graft copolymer formed was crosslinkable.

Run #2:

Using the procedure described above, 16.15 weight percent of IBMA monomer was reacted with the poly(oxyalkylene) polymer of Run #1 using the same amount of t-butyl perbenzoate initiator as in Run #1. The reaction, however, was carried out at 75° C. reactants being added over a period of 17 minutes and a final reaction time of 5 hours being used. The reaction product was a hazy liquid with crystal-like gel masses present.

Run #3:

Using the procedure described above, 16.6 weight percent of IBMA monomer reactant (mole ratio of monomer to polymer of 3.55:1) was reacted with a polyoxypropylene monobutyl ether having a viscosity of 1715 SUS at 150° C. in the presence of 1.54 weight percent of t-butyl perbenzoate. The addition time for the reactants was 112 minutes and the reaction mixture was heated at 150° C. for 60 minutes after addition of the reactants. The final reaction product mixture was a viscous amber liquid which formed a rubber-like gel after heating for 60 minutes at 150° C.

Run #4:

Using the procedure described above, 15 weight percent of IBMA monomer was reacted with polyoxypropylene monobutyl ether having a viscosity of 385 SUS in the presence of 1.65 weight percent of t-butyl perbenzoate at 150° C. The reactants were added to the reactor charge over a period of 47 minutes and the reaction mixture was then heated at 150° C. for an additional 25 minutes. The reaction product was a homogeneous amber fluid which formed a rubber-like gel when heated at 150° C. for 60 minutes.

EXAMPLE 4

A 250 ml three neck round bottom flask equipped with a stirrer was used in this example. To this reactor was charged 120 grams of distilled water, 0.5 grams of sodium bicarbonate, 0.5 grams of sodium sulfite and 0.5 grams of sodium persulfate. After dissolution of the salts was completed by stirring, 15.3 grams (0.0059 moles) of the poly(oxyalkylene) polymer used in Example 2 were added and the resulting solution was cooled to 0° to 5° C. A 48 percent aqueous solution of N-methylolacrylamide containing 7.4 grams (0.034 moles) (28.6 weight percent of the total charge) with 5.0 grams additional water was added dropwise to the reaction mixture over a period of 15 minutes. After addition of all reactants was completed, the reaction mixture was stirred for an additional 45 minutes while maintaining the temperature at 0° to 5° C., and then the reaction mixture was allowed to warm to room temperature.

The reaction product was a clear solution which when used as a treatment for polyester fabric was shown to withstand at least 5 water wash cycles using a commercial detergent in a mechanical washing machine.

EXAMPLE 5

The procedure of Example 4 was repeated except that 18.6 weight percent, based on the total charge, of N-methylolacrylamide grafting monomer was used and the poly(oxyalkylene) compound was an ethylene glycol started ethylene oxide/propylene oxide (75/25 by weight) having a viscosity of 5000 SUS and a molecular weight of 5000.

The reaction product was a clear solution which when used as a treatment for polyester fabric was shown to withstand at least 5 water wash cycles using a commercial detergent in a mechanical washing machine.

We claim:

1. A graft copolymer of N-(isobutoxymethyl)acrylamide and a poly(oxyalkylene) having up to about 70 percent by weight of said N-(isobutoxymethyl)-acrylamide grafted onto a poly(oxyalkylene) polymer having the formula:

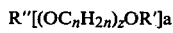

wherein $R''$ is a hydrocarbon radical containing up to 10 carbons having a valence of a, a is an integer having a value from 1 to 4, $R'$ is a hydrogen atom or a monovalent hydrocarbon radical containing up to 6 carbons, n has a value of 2 to 4, and z is an integer having a value of about 2 to about 800, wherein said graft copolymer is crosslinkable and film formable.

2. A graft copolymer of N-(methylol)-acrylamide and a poly(oxyalkylene) having up to about 70 percent by weight of said N-(methylol)-acrylamide grafted onto a poly(oxyalkylene) polymer having the formula:

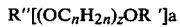

wherein $R'$ is a hydrocarbon radical containing up to 10 carbons having a valence of a, a is an integer having a value from 1 to 4, $R'$ is a hydrogen atom or a monovalent hydrocarbon radical containing up to 6 carbons, n has a value of 2 to 4, and z is an integer having a value of about 2 to about 800, wherein said graft copolymer is crosslinkable and film formable.

* * * * *